United States Patent
Bourque et al.

(10) Patent No.: US 8,255,151 B2
(45) Date of Patent: Aug. 28, 2012

(54) METHOD AND SYSTEM FOR PROVIDING ENVIRONMENTALLY-OPTIMIZED NAVIGATION ROUTES

(75) Inventors: Francis Bourque, Mundelein, IL (US); Sanjay Gupta, Lakewood, IL (US); Mark Hansen, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 843 days.

(21) Appl. No.: 12/331,177

(22) Filed: Dec. 9, 2008

(65) Prior Publication Data
US 2010/0145569 A1   Jun. 10, 2010

(51) Int. Cl.
*G01C 21/00* (2006.01)
(52) U.S. Cl. .................... 701/400; 701/31.4
(58) Field of Classification Search .......... 701/201, 701/31.4
See application file for complete search history.

(56) References Cited

U.S. PATENT DOCUMENTS

| | | |
|---|---|---|
| 2002/0087262 A1 | 7/2002 | Bullock et al. |
| 2002/0128766 A1* | 9/2002 | Petzold et al. ............... 701/201 |
| 2002/0156572 A1 | 10/2002 | Bullock et al. |
| 2003/0060977 A1* | 3/2003 | Jijina et al. .................. 701/210 |
| 2006/0247852 A1 | 11/2006 | Kortge et al. |
| 2007/0005237 A1* | 1/2007 | Needham et al. ............. 701/202 |
| 2008/0103657 A1* | 5/2008 | Norton et al. .................. 701/35 |
| 2008/0103686 A1 | 5/2008 | Alberth et al. |

OTHER PUBLICATIONS

TomTom, "TomTom IQ Routing", http://www.tomtom.com/whytomtom/topic.php?topic=5&subject=3.
Dash Express, "Dash Express Navigation", http://www.dash.net/product/traffic.php.
PIER, "Personal Environmental Impact Report", http://pier.cens.ucla.edu.
WIRED, "2008 WIRED NextFest Exhibits", http://www.wirednextfest.com/inform/2008/exhibits/PEIR.php.

* cited by examiner

*Primary Examiner* — Jeffrey A Smith
*Assistant Examiner* — Resha Desai (57) ABSTRACT

A method (500) and navigation system (100) are provided that generate a navigation route that is environmentally optimized between an origin and destination. Upon receiving an origination location and destination from a user or other source, such as a GPS satellite (104), a route determination module (302) determines multiple routes between the origination location and destination. An environmental analysis module (301) then processes each route to determine an environmental impact value. An evaluation module (303) then can selects a proposed route for presentation to the user via a presentation module (304). Alternatively, the evaluation module (303) may select two or more routes, which the presentation module (304) may present with corresponding environmental impact data such that the user may select a particular route. Additionally, a green coach module (306) may provide instructions to the user for more environmentally beneficial operation of a vehicle (102).

22 Claims, 6 Drawing Sheets

METHOD AND SYSTEM FOR PROVIDING ENVIRONMENTALLY-OPTIMIZED NAVIGATION ROUTES

BACKGROUND

1. Technical Field

This invention relates generally to a method and apparatus for route navigation between an origin and a destination, and more specifically to generating a plurality of possible navigation routes and processing each navigation route to select a less environmentally harmful navigation route for presentation to a user.

2. Background Art

Navigation systems, be they vehicular, handheld, embedded in an electronic device, or other, are devices that provide maps and navigation instructions to a user so the user can travel from an origination location to a destination location. Some navigation devices include a proximity detection device, such as a Global Positioning System (GPS) receiver, which can determine the current location of the system using GPS satellites. Using map data located either on the device or in a remote map server, the navigation system can display a map and navigation instructions to the user.

It is generally the case that multiple routes exist between any given origin and destination. For example, there may be one route along surface streets while another route passes along the highway. One route may pass through commercial districts, while another route passes through bypass roads, and so forth.

Many prior art navigation systems are configured to select an optimal route based upon time or distance. For example, where multiple routes exist, many navigation systems simply calculate the distance to be traversed along each route and select the shortest route for presentation to the user. This is often less than ideal in that a selected route may take longer to traverse than other longer routes due to traffic, traffic signals, accidents and so forth. Other navigation systems use speed limit information to determine a shortest time along each route. However, these systems fail to provide any advantage over the distance based systems as they often fail to consider traffic congestion, accidents, number of traffic signals or intersections, and so forth.

The problem with each of these prior art navigation systems is that the presume time is the highest priority interest when selecting a navigation route from multiple navigation routes. However, for many people time is not the foremost consideration. Other factors are more important.

There is thus a need for an improved navigation system and corresponding method for presenting navigation routes selected based upon criteria other than time or distance.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method and a system for providing a navigation route that is environmentally preferred or optimized. Many people today are concerned about their impact upon the environment. People often worry about the "carbon footprint" associated with their activities. They desire to reduce their consumption of fossil or other fuels, and to reduce greenhouse gas emissions associated with their activities.

To assist in satisfying this desire, embodiments of the present invention provide for determining a plurality of navigation routes existing between a particular origination location and destination, and processing each navigation route to obtain a corresponding environmental impact value. For example, embodiments of the invention provide the application of value functions to data corresponding to the various navigation routes to select an optimal route intended to minimize the environmental impact of transportation between a given origination location and destination. In one embodiment, a heuristic function is applied as a filter. The heuristic function can be configured to consider route characteristic data and/or vehicular data to estimate the environmental impact of a particular vehicle traversing that navigation route. From the estimate, a preferred route or optimized route may be selected. Embodiments of the invention can be used to promote driving habits that can reduce the carbon footprint associated with a user's travel.

Examples of metrics that can be considered in the value function applied to the various navigation routes include factors such as the number of stops or the number of traffic signals or intersections along the route. One embodiment of the invention considers, for example, idling time associated with each of these stops when determining the optimal or preferred environmentally friendly route. Other embodiments of the invention include metrics such as minimizing the variations in elevation on a particular navigation route, minimizing the number of left hand turns, maximizing the number of right hand turns, or alignment of an expected driving speed with fuel consumption information received from a vehicle. As slower speeds often result in reduced carbon emission profiles, some embodiments of the invention consider the maximum or typical speed along the route when determining the most environmentally friendly route. Further, map data information is considered in some embodiments to select roads with synchronized or sequenced traffic signals.

In one embodiment, the navigation system is integrated with a "green coach." The green coach is an application that receives vehicular data from a vehicle and provides suggestions relating to environmentally friendly habits that a user may adopt to may his vehicular use more "green." For example, in one embodiment, the green coach is configured to receive information from a vehicle such as emissions data, fuel economy data, engine performance data, braking data, engine idling data, engine temperature data, and so forth. From these data, the green coach is configured to assist the driver with driving habits such as accelerating at an environmentally optimized rate, reaching environmentally optimized speeds, and so forth. In one embodiment, the green coach considers additional navigation information, such as whether synchronized or sequenced traffic signals are employed along a particular route, the distance to an upcoming turn or other maneuver, whether the vehicle is moving down hill or uphill, and current weather conditions or engine temperatures. The green coach in one embodiment is configured to provide suggestions regarding starting and stopping the engine to avoid excessive engine idling times due to a particular route, location, or traffic condition.

Figure 1:
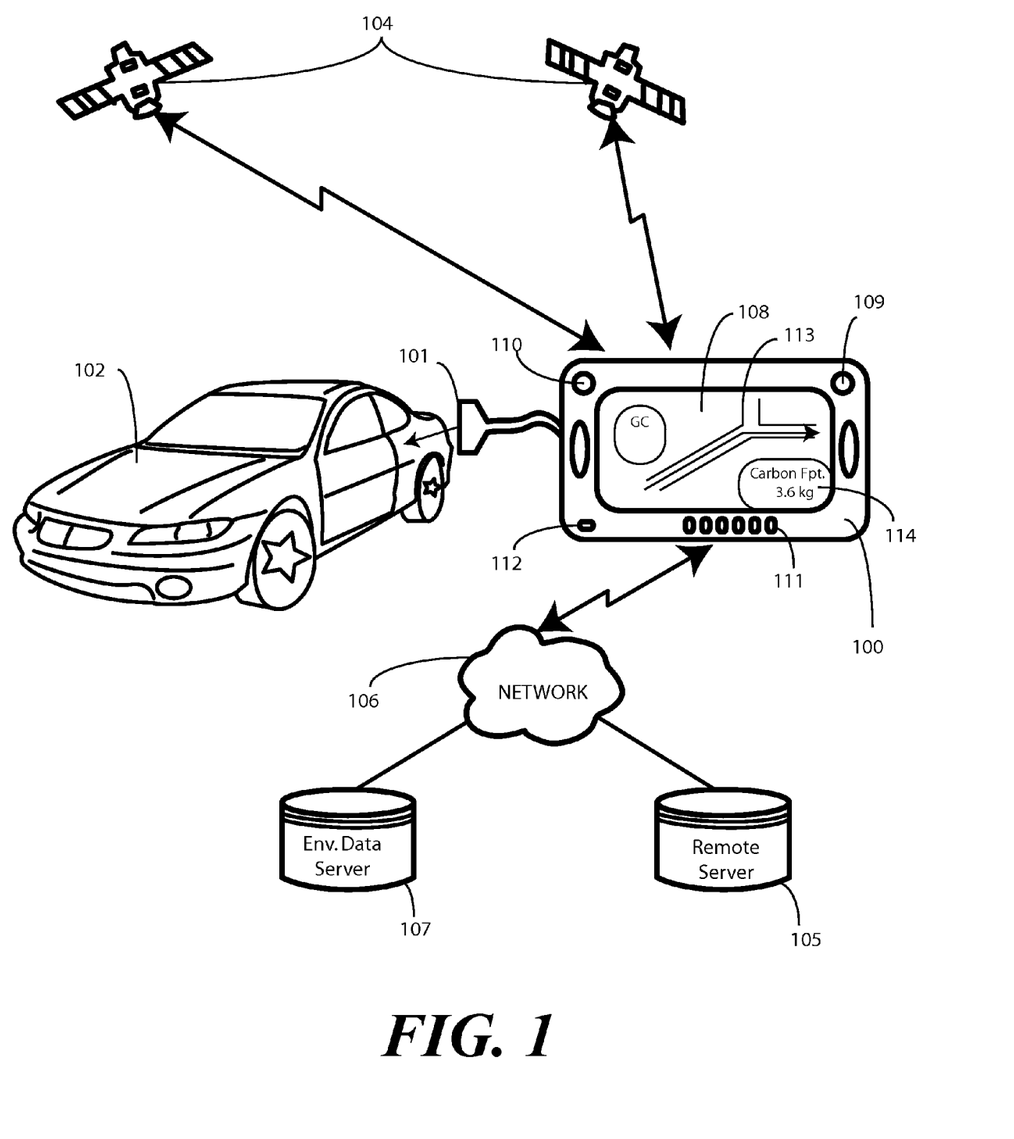
FIG. 1 illustrates one embodiment of a system for determining an environmentally preferred navigation route in accordance with embodiments of the invention.

Turning now to FIG. 1, illustrated therein is a diagram of one application for a navigation system 100 in accordance with embodiments of the invention. Note that the navigation system can be coupled to or integrated a vehicle 102. However, it will be obvious to those of ordinary skill in the art having the benefit of this disclosure that the invention is not so limited. Navigation systems 100 in accordance with the present invention can also be handheld or portable devices as well. Such devices are usable with multiple vehicles, scooters, motorcycles, public transportation, and so forth.

In the illustrative embodiment of FIG. 1, the navigation system 100 includes various interface elements such as a display 108, one or more control knobs 109, one or more indicators 110 such as bulbs or light emitting diodes, one or more speakers 111, a microphone 112, and any other interface elements required by a particular application or environment. In one embodiment, the navigation system 100 is coupled to navigation applications and modules stored either within the device or on a remote server 105, and can request and display route guidance data including, navigation route data, and digital roadmap data 113 on the display 108. Further, environmental impact information 114 can be presented on the display 108. While these are illustrative details of the navigation system 100, embodiments of the invention are not limited by the user interface or the elements depicted in FIG. 1. As those skilled in the art will appreciate, the user interface and corresponding elements outlined above are meant to be representative and to not reflect all possible user interface devices or elements that may be employed.

Where the navigation system 100 is to be coupled with a vehicle 102, the navigation system 100 may include an optional vehicular adaptor 101 that is configured to couple to an electronic output within the vehicle 102 so as to receive vehicular data corresponding to performance of the vehicle. This vehicular data can include, but is not limited to, fuel economy data, fuel consumption data, emissions data, braking data, engine idling data, or engine performance data.

In the illustrative application of FIG. 1, the navigation system 100 receives destination information from GPS satellites 104. While the use of location determination devices, such as the GPS satellites 104 of FIG. 1 is helpful in determining, for instance, an origination location and a current location, the use of such devices is optional. In embodiments of the present invention, the navigation system 100 can receive data corresponding to an origination location from a user as well. For example, the user may manually enter GPS coordinates or an address corresponding to the point of origin. In such case, the navigation system 100 may not need to determine the origination location in real time. Alternatively, as a convenience feature, the navigation system 100 can include a GPS Receiver that communicates via links 103 with the GPS satellites 104 to determine a present location without user input.

Upon receiving information corresponding to a point of origin and a destination, the navigation system 100 is then configured to determine a plurality of navigation routes between the origin and the destination. In one embodiment, the navigation system 100 includes a processor, which can be any of a computer, microprocessor, programmable logic, or application specific integrated circuit that is configured to execute the functions of the system. Such a processor works in conjunction with an associated memory or other storage devices. The memory or storage devices can store an operating system and applications, which are executable by the processor, to control functions and operations of the navigation system 100.

The navigation system 100, in one embodiment, is configured to determine the plurality of navigation routes by accessing map information. The map information can be stored locally within the navigation system 100. Alternatively, the navigation system 100 may access map information from a remote server 105 through a network 106. The map information stored in either the navigation system 100 or the remote server 105 can include, but is not limited to, digital road map data, route alternatives, route guidance, route algorithms, route storing algorithms, map databases having distributed map database and traffic databases, and the like.

The remote server 105 may further include traffic servers that contain traffic information. The traffic information can include, but is not limited to, traffic reports, traffic conditions, speed data, and the like. The remote server 105 can further include traffic databases containing traffic information, such as traffic conditions, road closures, construction, and the like. The remote server 105 can include point of information databases as well, which provide information for points of interests such as gasoline stations, restaurants, motels, and movie theatres. In one embodiment the remote server 105 communicates with the navigation system 100 by sending and receiving content data such as local traffic reports and news agencies, in addition to content data already stored in the navigation system 100.

Once the plurality of navigation routes has been determined, the navigation system 100 is configured to process each of the navigation routes to obtain an environmental impact value corresponding to each route. As will be shown in more detail below, this can be accomplished in a variety of ways. In one embodiment, the navigation system is configured to process environmental data corresponding to each route. The environmental data can be obtained in a variety of ways. In one embodiment, the environmental data is stored within the navigation system. In another embodiment, vehicular data is received from the vehicle 102 and is converted to environmental data by application of a plurality of filters that interpret the vehicular data to obtain environmental metrics that can be applied to each route. In another embodiment, environmental data corresponding to the various routes is stored on an environmental data server 107. In such an embodiment, the navigation system 100 communicates with the environmental data server 107 and retrieves the environmental data across the network 106.

In one embodiment, the environmental data on the environmental data server 107 includes statistical data, factors, filters, and functions that indicate or otherwise correspond to the environmental impact of particular routes or route sections as traveled by a vehicle. In one embodiment, the environmental data can be combined or applied in conjunction with vehicular data received from the vehicle so as to provide an environmental impact value that corresponds to a particular car, truck, or other vehicle. In one embodiment, the environmental data includes heuristic filters or other algorithms that are adapted to determine a least environmentally harmful route between an origin and a destination by using a route plus environmental impact heuristic algorithm. For instance, navigation route function, which may consider factors such as distance, right hand versus left hand turns, elevational changes, number of stops, and so forth, and which may not be heuristic, may be combined with a heuristic environmental impact function to determine a resulting environmental impact value by estimating the environmental impact. Heuristic functions can be configured, for example, to estimate a carbon footprint associated with each of the navigation routes for presentation to a user.

Once the environmental impact value is determined, the navigation system 100 selects at least one of the navigation routes on the display 108. The selection may be a proposed route, such as a single route having the least environmentally harmful impact factors, or may be a selection of optional routes with environmental impact data presented with each route. In the latter embodiment, a user may select a route considering non-environmental factors, such as time, schedule, and so forth. Navigational information corresponding to either the proposed route or the selected route can then be presented on the display 108.

Figure 2:
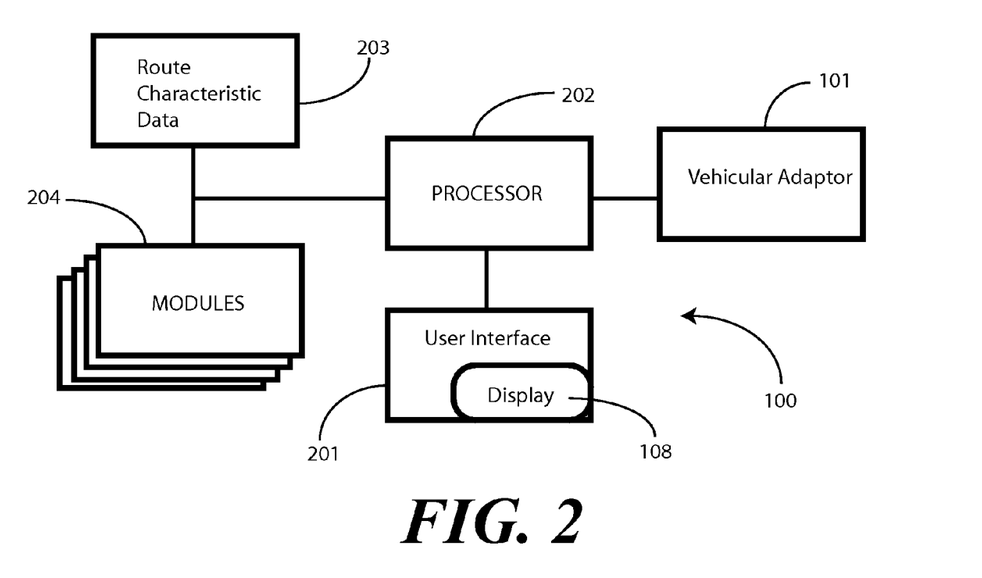
FIG. 2 illustrates an exemplary block diagram of a navigation device in accordance with embodiments of the invention.

Turning now to FIG. 2, illustrated therein is a block diagram of an exemplary navigation system 100 in accordance with embodiments of the invention. The navigation system 100 includes a user interface 201 for receiving an origination location and a destination from the user. A processor 202 is coupled to the user interface 201. The processor 202 is responsible for device functionality as described above. The display 108 is coupled to the processor 202. Where the navigation system 100 is to be coupled to a vehicle, an optional vehicular adaptor 101 is also provided. In one embodiment, the vehicular adaptor 101 is configured to couple to a vehicle and receive vehicular data corresponding to performance of the vehicle.

The processor 202, in one embodiment, employs several modules 204 to determine an environmentally optimized navigation route. These modules 204 include an environmental analysis module, and evaluation module, and a presentation module. These modules 204 can be configured as executable code in the form of software or firmware to execute the functions of embodiments of the invention. Such modules 204 comprise instructions, such as control algorithms, that are stored in a computer-readable medium such as the memory described above. Such computer instructions can instruct processors like processor 202 to perform methods of determining environmentally optimized navigation routes. In other embodiments, additional modules could be provided as needed.

In one embodiment, the processor 202 is configured to determine an environmentally optimized route by processing each of the navigation routes with route characteristic data 203. The route characteristic data 203, which may be stored locally or received from a remote server (105) or environmental data server (107), is processed with each of the plurality of navigation routes to determine the corresponding environmental impact on each route. The route characteristic data 203 may be locally stored, cached, downloaded, or accessible across a network (106).

The route characteristic data 203 can include, but is not limited to, the following: number of stops along each route; number of intersections along each route; elevation changes along each route; average or top speed along each route; anticipated changes in acceleration along each route; traffic conditions, congestion, time of day, day of the week, special events (parades, etc.), or accident reports along each route; traffic signal synchronization along each route; number of right hand turns or left hand turns along each route; and the like.

Figure 3:
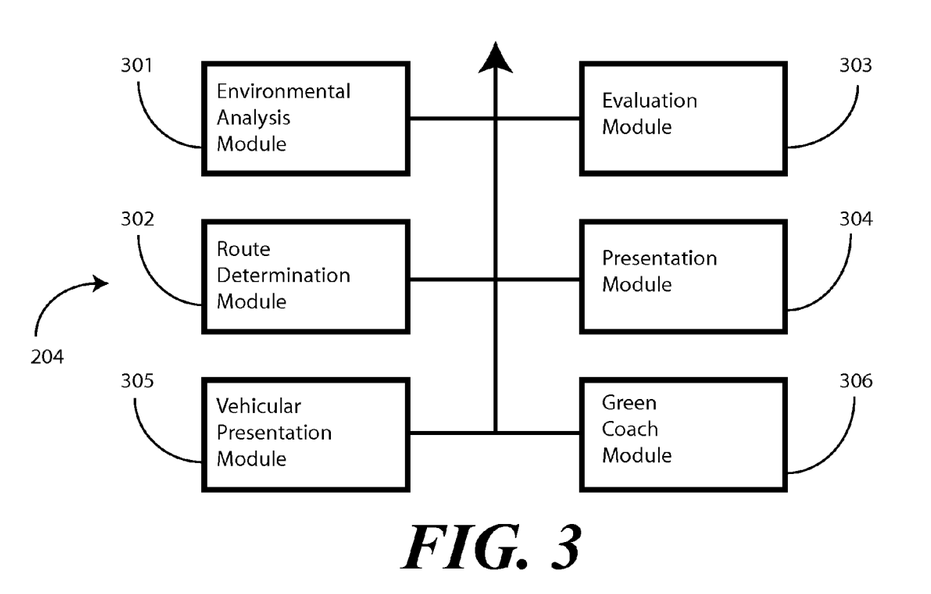
FIG. 3 illustrates exemplary modules suitable for use with a processor in accordance with embodiments of the invention.

Turning now to FIG. 3, illustrated therein are exemplary modules 204 suitable for use with embodiments of the invention. The exemplary list of modules includes environmental analysis module 301, a route determination module 302, an evaluation module 303, a presentation module 304, a vehicular presentation module 305, and a green coach module 306. These modules are illustrative only, as various embodiments of the invention may include subset combinations of these modules, or additional modules that are not shown.

The environmental analysis module 301 is operable with the processor (202) and is configured to determine an environmental impact value corresponding to each navigation route determined between the origin and the destination. The route determination module 302 determines these routes based upon an origination location and destination location received from a user or other source.

Once the environmental analysis module 301 has processed the environmental impact of each route, a particular vehicle traversing each route, or other factors, a weighted score is represented as an environmental impact value. The evaluation module 303 is then configured to select a proposed route having a corresponding environmental impact value indicating the proposed route is a lesser environmentally harmful route than other routes. The evaluation module 303 may select a single route as a proposed route. Alternatively, the evaluation module 303 may select two or more routes for presentation to the user with corresponding environmental impact data. For example, the evaluation module 303 may represent the environmental impact value as a weighted score on a scale. By presenting this information to the user, the user can select a particular route from the two or more routes with knowledge of the comparison of the environmental impacts between each route. The presentation module 304 is then configured to present the one or more of the navigation routes on the display (108) of the user interface (201). The presentation module 304 can also present navigation instructions corresponding to the one or more of the navigation routes on the user interface in text, video, audio, or other format.

In one embodiment, the environmental analysis module 301 is configured to apply and process vehicular data received from the vehicular adaptor (101) to better estimate the environmental impact of that particular vehicle traveling along each route. The environmental analysis module 301 does this by incorporating fuel efficiency data, fuel consumption data, and so forth, with the route characteristic data (203), and by applying functions and filters to each route. When presenting a proposed route or two or more routes to a user, the presentation can include some of the vehicular data. In particular, the vehicular data presentation module 305, in one embodiment, is configured to provide an environmental analysis of the vehicular data on the user interface (201).

The green coach module 306 is configured, in one embodiment, to provide information on the display (108) or user interface (201) that assists the user in environmentally friendly driving habits. For example, the green coach module 306 can be configured to teach the user to accelerate at the most environmentally conscientious manner. Similarly, the green coach module 306 can be configured to suggest speed for the user to reach in accordance with speed limits, synchronization of traffic lights or signals, or distance to the next maneuver. The green coach module 306 can be configured to provide target speeds for optimal travel time versus fuel consumption by using the map data and vehicular data. The green coach module 306 can additionally suggest that the user turn-off the engine to avoid long idling situations based on a particular route, location, traffic condition, or situation, such as sitting at a railroad crossing. In one embodiment, the green coach module 306 is configured to present the user with advice for driving down or up hills so as to minimize the environmental impact. Each of the instructions presented by the green coach module 306 may change with external influences, such as weather conditions, engine temperature, and so forth.

Figure 4:
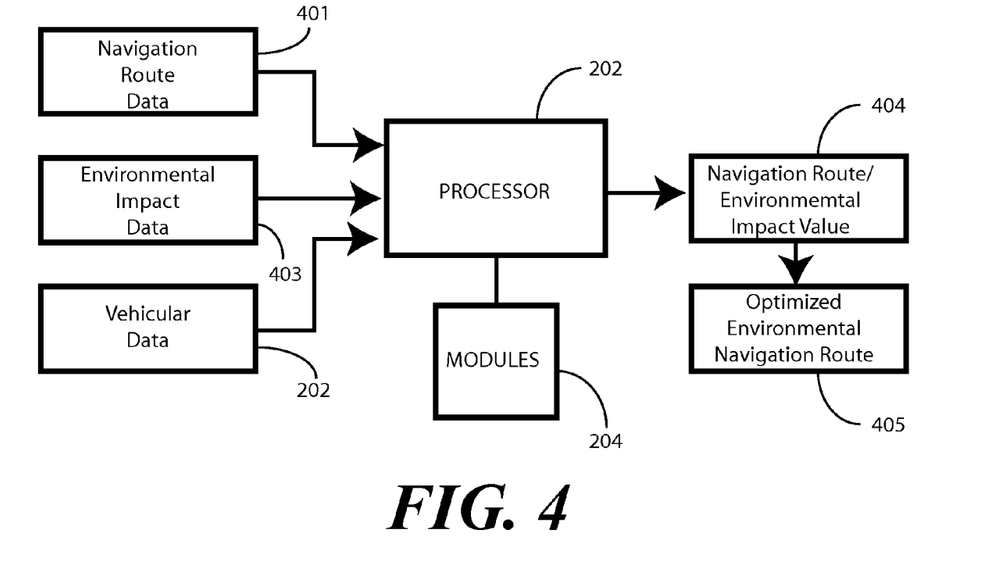
FIG. 4 illustrates one block flow diagram of a system for determining an environmentally preferred navigation route in accordance with embodiments of the invention.

Turning now to FIG. 4, illustrated therein is a simplified block diagram illustrating a method for providing an environmentally optimized route in accordance with embodiments of the invention. As shown in FIG. 4, navigation route data 401, environmental impact data 402, which can comprise route characteristic data (203) and other environmental impact information, and optionally vehicular data 402, are input into the processor 202. The processor 202 then employs its modules 204, which can include the route determination module (302) and the environmental analysis module (301), to determine a plurality of navigation routes and environmental impact scores corresponding thereto. By employing the evaluation module (303), the processor 202 determines an optimized environmentally friendly navigation route 405, which is presented to the user via the presentation module (304).

The navigation route data 401 can include, but is not limited to, position data, velocity data, time data, and the like, anticipated along any portion of a navigation route that may be traveled by the user. Examples of time data include, but are not limited to total travel time of the navigation route, intermediate travel times of individual route links, time of day, day of the week, and the like. Examples of velocity data include, but are not limited to average velocity, instantaneous velocity, and the like, which can also be for a given time of day or day of the week. The navigation route data 206 can include also historical travel time data from traffic observations aggregated over time from one or more users, as well as data from static digital road map databases, road segments, route links, and the like. Road segments are elements in a digital road map database that represent route links in the actual road network. Route links are defined as sections of the roadway between intersections. Route links are road segments that are incorporated into a computed or defined navigation route.

Figure 5:
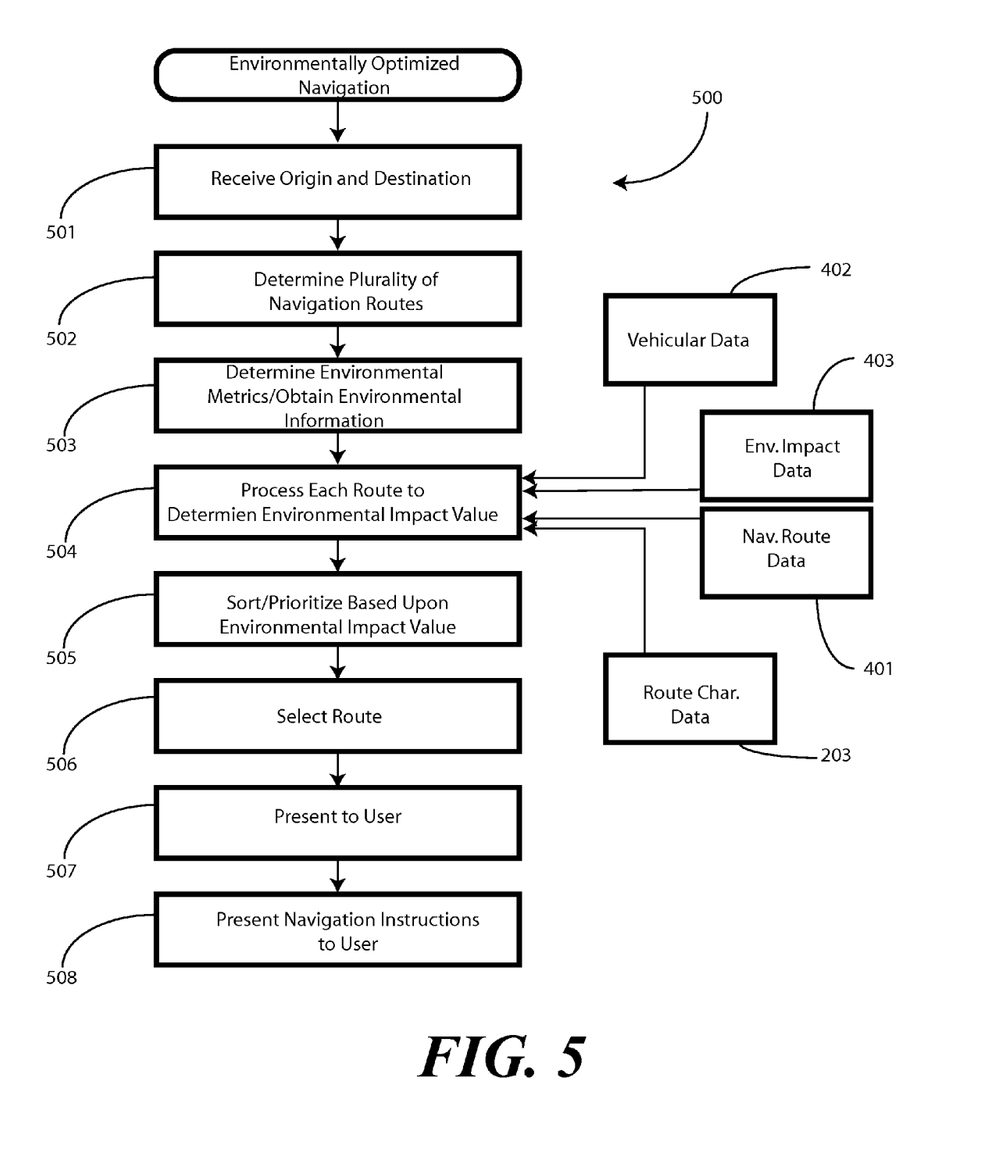
FIG. 5 illustrates one method of determining an environmentally preferred navigation route in accordance with embodiments of the invention.

Turning now to FIG. 5, illustrated therein is one method 500, operable with an electronic device such as processor 202 of FIG. 2, for providing an environmentally optimized navigation route in accordance with embodiments of the invention. At step 501, data corresponding to an origin and a destination is received. As set forth above, this data can come from a user, or may alternatively come from other sources such as GPS satellites (104).

Once the origin and destination are known, a plurality of navigation routes between the origin and the destination is determined at step 502. At optional step 503, environmental metrics may be determined. The environmental metrics can include factors such as air quality, time of day, and so forth.

Each route is then processed to obtain an environmental impact value corresponding to each routes at step 504. In one embodiment the step 504 of processing includes the application of a heuristic filter configured to determine an estimated carbon footprint associated with each of the plurality of navigation routes. The estimated carbon footprint maybe presented to the user on the display (108) along with a particular route.

As noted above, the step 504 of processing can include processing navigation route data 401, route characteristic data 203, vehicular data 402, and environmental impact data 403. For example, in one embodiment step 504 include the processing of received vehicular data 402 to determine a corresponding environmental impact on each routes.

Figure 7:
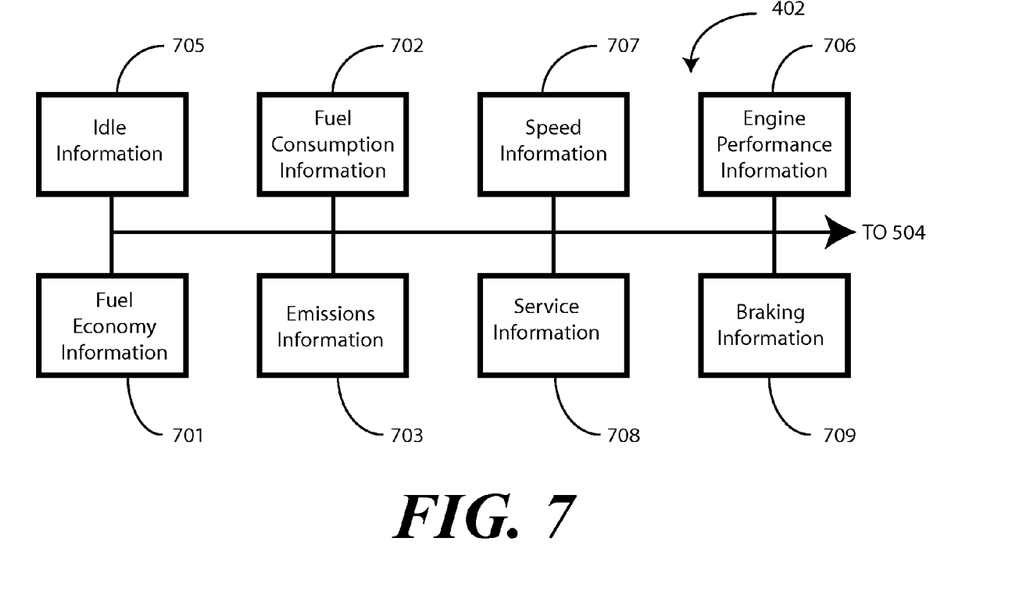
FIG. 7 illustrates exemplary vehicular data suitable for use with embodiments of the invention.

Turning briefly to FIG. 7, illustrated therein are various types of vehicular data 402 that may be considered in the processing step (504) of FIG. 5. The information presented in FIG. 7 is illustrative only, as it will be obvious to those of ordinary skill in the art having the benefit of this disclosure that the invention is not so limited. Data other than that shown in FIG. 7 may be considered as well. The exemplary data of FIG. 7 includes fuel economy data 701, fuel consumption data 702, emissions data 703, braking data 704, engine idling data 705, engine performance data 706, real time speed data 707, or vehicle service history data 708. Further, combinations of this data may be considered.

Figure 8:
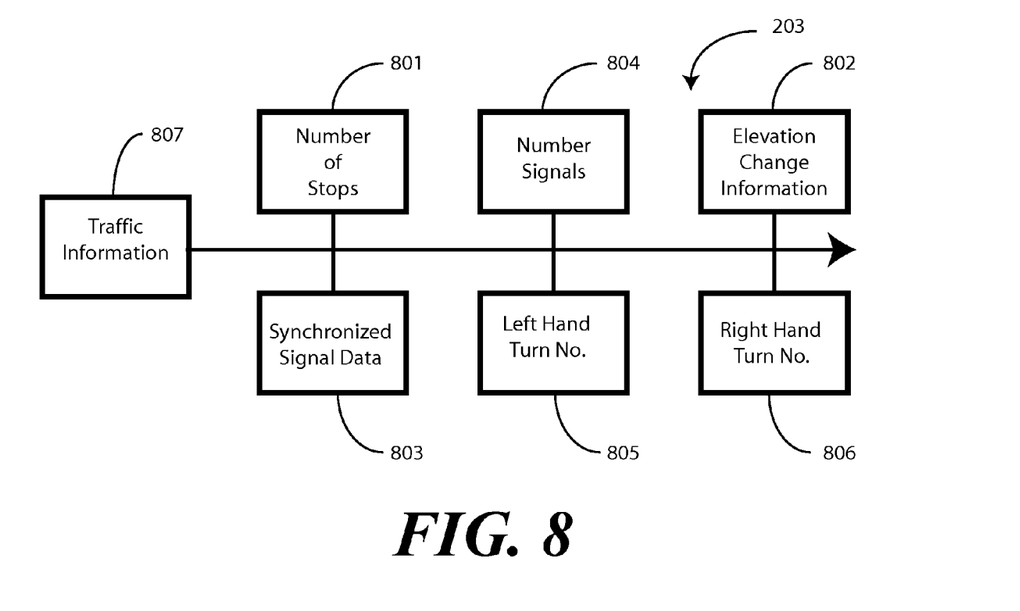
FIG. 8 illustrates exemplary route characteristic data suitable for use with embodiments of the invention.

Turning now back to FIG. 5, in one embodiment of the invention, step 504 includes processing route characteristic data 203 with each of the plurality of navigation routes to determine a corresponding environmental impact on each route. Turning briefly to FIG. 8, illustrated therein are various types of route characteristic data 203. The data of FIG. 8 is intended to be illustrative only, as it will be obvious to those of ordinary skill in the art having the benefit of this disclosure that the invention is not so limited. Data other than that shown in FIG. 8 may be considered as well.

In one embodiment, the route characteristic data 203 comprises a number of stops corresponding to each of the plurality of navigation routes. The route characteristic data 501 can also include elevation change data 802 along each of the plurality of navigation routes, traffic signal synchronization data 803 for each of the plurality of navigation routes, traffic signal quantity data 804 for each route, and so forth.

The route characteristic data 203 can include left hand turn quantity data 805 and right hand turn quantity data 806. In one embodiment, the step (504) of processing includes determining a quantity of right hand turns and a number of left hand turns associated with each route. In such a scenario, the step (505) of sorting and the step (506) of selecting a route includes selecting routes having more right hand turns over routes having less right hand turns.

The route characteristic data 203 can also include traffic data 807. This traffic data 807 may include traffic congestion data for each of the navigation routes. The traffic congestion data may be used to determine a corresponding environmental impact on each of the plurality of navigation routes.

Turning now back to FIG. 5, after determining the environmental impact values, at step 505 the routes are sorted based upon the route characteristic data 203. Additional factors may be considered at this step, including whether there is a traffic accident along a particular route. A normally environmentally friendly route may be rendered relatively environmentally harmful where, for example, there is an accident along that route that causes a traffic jam.

At step 506, at least one navigation route is selected based upon the environmental impact value corresponding thereto. Generally speaking, this step 506 includes selecting navigation routes that are less environmentally harmful routes, based upon the environmental impact value, over more environmentally harmful routes. At step 507, the route is presented to the user. Where navigation instructions, such as textual, audio, or video directions, are required, they are presented at step 508.

As noted above the step 507 of selecting a route may include the automatic selection of a single, proposed route. In such as case, the environmental impact value corresponding to the proposed route would indicate that the proposed route is a lesser or least environmentally harmful route of the various navigation routes determined at step 502. Alternatively, step 507 may be a presentation of multiple routes with corresponding environmental impact data.

Figure 6:
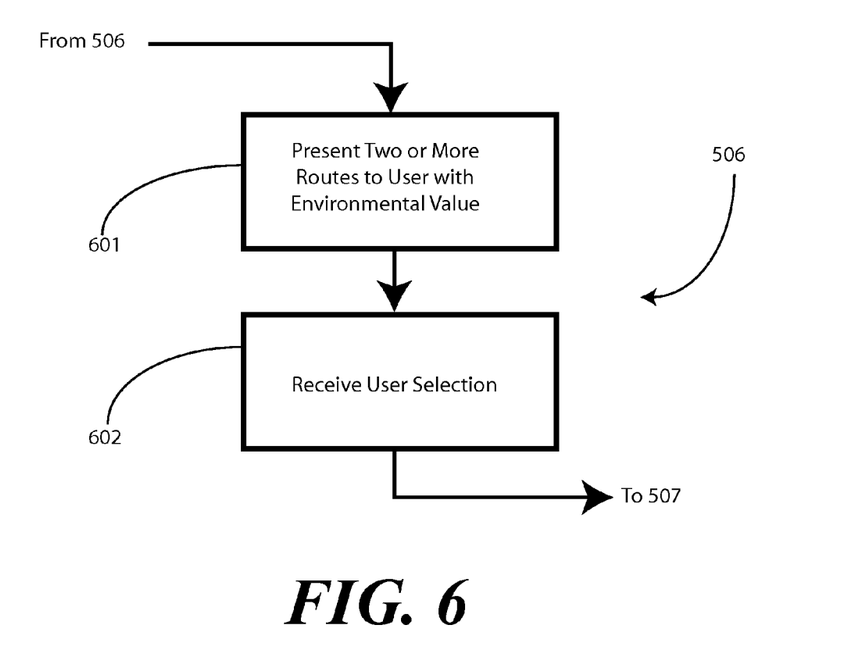
FIG. 6 illustrates sub-steps of one method of determining an environmentally preferred navigation route in accordance with embodiments of the invention.

Turning briefly to FIG. 6, illustrated therein is step 507 when multiple routes are presented to the user. Specifically, at step 601, two or more navigation routes with environmental impact values corresponding thereto are presented to the user. The presentation of multiple routes allows the user the freedom to make a route selection considering not only environmental impact, but other factors as well. At step 602, a user selection from the two or more navigation routes is received. Upon receiving this selection, the presenting navigation instructions corresponding to the user selection can be presented in step 507 of FIG. 5.

Figure 9:
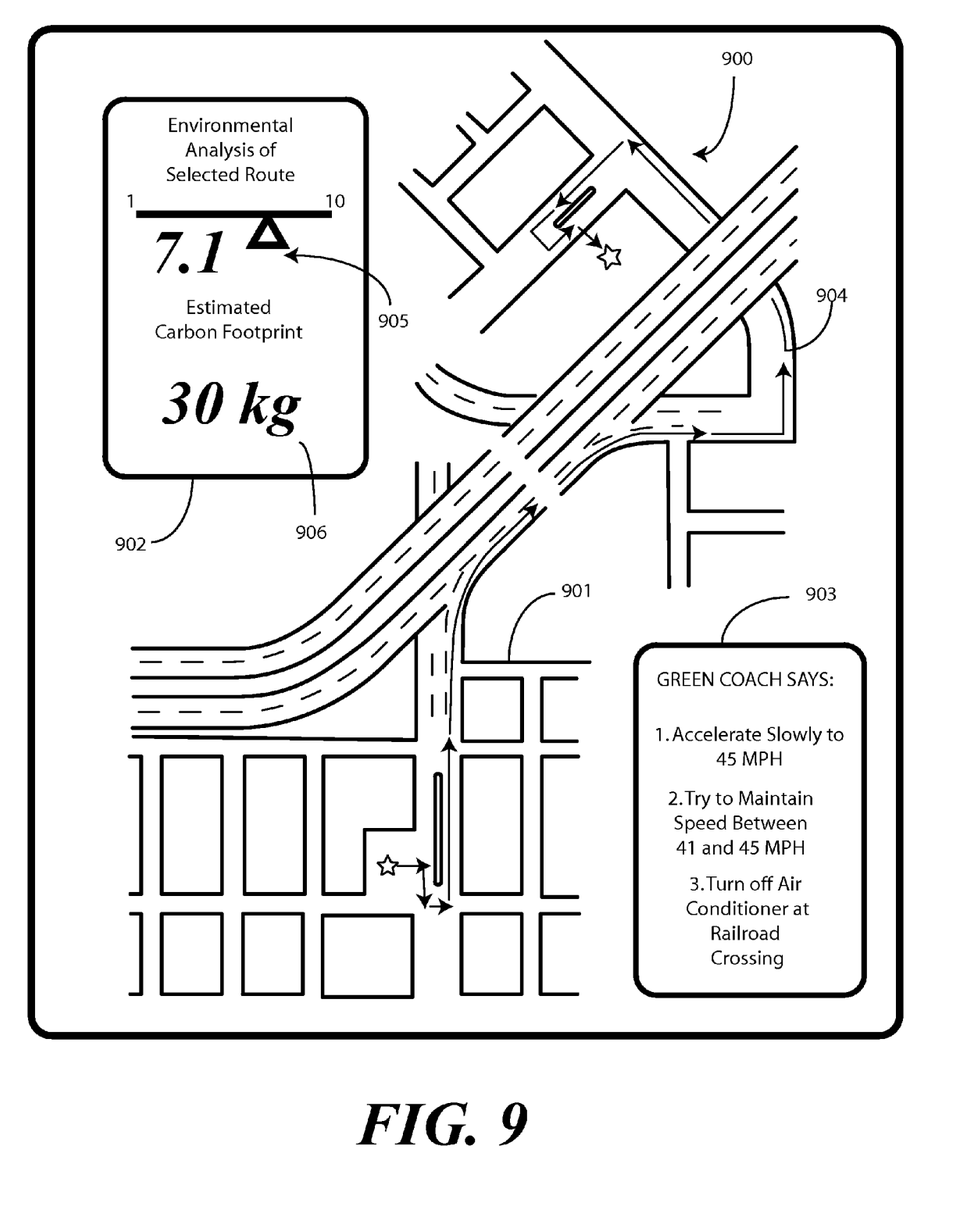
FIG. 9 illustrates an exemplary display of a navigation device in accordance with embodiments of the invention.

Turning now to FIG. 9, illustrated therein is an exemplary display presentation 900 that may be presented to a user on a display (108) in accordance with embodiments of the invention. The display includes a graphical presentation 901 of a map and a proposed route that has been selected for the user as an environmentally optimized route.

Along the graphical representation 901 of the map, environmental impact information 902 is shown. In the illustrative embodiment of FIG. 9, the environmental impact information 902 includes a representation 905 of the environmental impact value on a relative scale of one to ten. Additionally, the estimated carbon footprint 906 corresponding to the user's vehicle traversing the route in light of known route characteristic and other data is presented. In one embodiment, textual, audio, or video navigation instructions are presented along side the graphical representation 901 of the map.

In one embodiment, green coaching information 903 is also presented. As set forth above, this information can include instructions for the user to operate the vehicle in a more environmentally friendly manner.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, operable in a navigation device, of providing an environmentally optimized navigation route, comprising:
   receiving data corresponding to an origin and a destination;
   determining, with a processor of the navigation device, a plurality of navigation routes between the origin and the destination;
   processing, with the processor, each of the plurality of navigation routes to obtain an environmental impact value corresponding to each of the plurality of navigation routes;
   selecting, with the processor, at least one of the plurality of navigation routes based upon the environmental impact value corresponding thereto; and
   presenting, on a user interface, the at least one of the plurality of navigation routes;
   wherein the processing each of the navigation routes comprises determining a quantity of right hand turns and a number of left hand turns associated with each route, wherein the selecting at least one of the plurality of navigation routes comprises selecting routes having more right hand turns over routes having less right hand turns.

2. The method of claim 1, wherein the selecting at least one of the plurality of navigation routes comprises selecting a proposed route, wherein the environmental impact value corresponding to the proposed route is indicative of the proposed route being a least environmentally harmful route of the plurality of navigation routes.

3. The method of claim 1, wherein the selecting at least one of the plurality of navigation routes comprises selecting two or more navigation routes, wherein the presenting the at least one of the plurality of navigation routes comprises presenting the two or more navigation routes with environmental impact values corresponding thereto.

4. The method of claim 3, further comprising receiving a user selection from the two or more navigation routes and presenting navigation instructions corresponding to the user selection.

5. The method of claim 1, wherein the selecting at least one of the plurality of navigation routes comprises selecting less environmentally harmful routes, based upon the environmental impact value, over more environmentally harmful routes.

6. The method of claim 1, wherein the processing each of the navigation routes comprises application of a heuristic filter configured to determine an estimated carbon footprint associated with each of the plurality of navigation routes.

7. The method of claim 1, wherein the processing each of the navigation routes comprises processing received vehicular data with each of the plurality of navigation routes to determine a corresponding environmental impact on each of the plurality of navigation routes.

8. The method of claim 7, wherein the received vehicular data comprises one of fuel economy data, fuel consumption data, emissions data, braking data, engine idling data, engine performance data, or combinations thereof.

9. The method of claim 1, wherein the processing each of the navigation routes comprises processing route characteristic data with each of the plurality of navigation routes to determine a corresponding environmental impact on each of the plurality of navigation routes.

10. The method of claim 9, wherein the route characteristic data comprises a number of stops corresponding to each of the plurality of navigation routes.

11. The method of claim 9, wherein the route characteristic data comprises elevation change data along each of the plurality of navigation routes.

12. The method of claim 9, wherein the route characteristic data comprises traffic signal synchronization data for each of the plurality of navigation routes.

13. The method of claim 1, wherein the processing each of the navigation routes comprises processing received traffic congestion data with each of the plurality of navigation routes to determine a corresponding environmental impact on each of the plurality of navigation routes.

14. A navigation device, comprising:
a user interface for receiving an origin and a destination;
a processor coupled to the user interface,
a route determination module, operable with the processor, and configured to determine a plurality of navigation routes traversing from the origin to the destination;
an environmental analysis module, operable with the processor, and configured to determine an environmental impact value corresponding to each of the plurality of navigation routes by determining a quantity of right hand turns and a number of left hand turns associated with each route and assigning routes having more right hand turns with a greater environmental impact value than routes having less right hand turns;
an evaluation module, operable with the processor, and configured to select one or more of the navigation routes based upon the environmental impact value corresponding to each of the plurality of navigation routes; and
a presentation module, operable with the processor, and configured to present the one or more of the navigation routes on the user interface.

15. The navigation device of claim 14, wherein the evaluation module is configured to select a proposed route having a corresponding environmental impact value indicative of the proposed route being a least environmentally harmful route of the plurality of navigation routes.

16. The navigation device of claim 14, further comprising a vehicular adaptor configured to couple to a vehicle and to receive vehicular data corresponding to performance of the vehicle.

17. The navigation device of claim 16, wherein the environmental analysis module is configured to apply the vehicular data to each of the plurality of navigation routes to determine the environmental impact value corresponding to each of the plurality of navigation routes.

18. The navigation device of claim 16, further comprising a vehicular data presentation module, operable with the processor, and configured to provide an environmental analysis of the vehicular data on the user interface.

19. The navigation device of claim 14, wherein the presentation module is configured to present navigation instructions corresponding to the one or more of the navigation routes on the user interface.

20. The navigation device of claim 14, further comprising a green coach module configured to provide suggestions on the user interface relating to navigational habits a user may adopt to reduce an environmental impact associated with vehicular usage on a selection of the one or more navigation routes, wherein the green coach module is configured to provide the suggestions based upon an analysis of one or more of emissions data, fuel economy data, engine performance data, braking data, engine idling data, engine temperature data, or combinations thereof.

21. The navigation device of claim 14, wherein the suggestions comprise one or more of accelerating at an environmentally optimized rate, reaching environmentally optimized speeds, or combinations thereof.

22. The navigation device of claim 20, wherein the green coach module is configured to provide the suggestions based upon an analysis of which of the one or more navigation routes comprises synchronized or sequenced traffic signals.

* * * * *